United States Patent
Hwang

(10) Patent No.: US 6,532,249 B1
(45) Date of Patent: Mar. 11, 2003

(54) TRANSMITTER OF MULTIPLE FREQUENCY RADIO COMMUNICATION SYSTEM

(75) Inventor: Seong-Kyu Hwang, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/366,008

(22) Filed: Aug. 2, 1999

(30) Foreign Application Priority Data

Aug. 1, 1998 (KR) .............................. 98/31442

(51) Int. Cl.[7] .............................. H04B 1/69; H04B 1/707
(52) U.S. Cl. .............................. 375/130; 375/146
(58) Field of Search .............................. 375/146, 140, 375/130, 240, 259, 260, 295; 370/320, 335, 342, 441, 479, 328, 329, 330, 527, 528, 529, 535; 455/45; 332/109

(56) References Cited

U.S. PATENT DOCUMENTS 5,452,288 A * 9/1995 Rahuel et al. .............. 370/19
6,175,550 B1 * 1/2001 Van Nee .............. 370/206

FOREIGN PATENT DOCUMENTS

| JP | 4-114506 | 4/1992 | ............ H03H/19/00 |
| JP | 6-334626 | 12/1994 | ............ H04J/13/00 |
| JP | 9-261201 | 10/1997 | ............ H04J/13/04 |
| JP | 9-289467 | 11/1997 | ............ H04B/1/26 |
| JP | 10-93475 | 4/1998 | ............ H04B/1/50 |

* cited by examiner

*Primary Examiner*—Don N. Vo
*Assistant Examiner*—Dung X. Nguyen
(74) *Attorney, Agent, or Firm*—Dilworth & Barrese, LLP

(57) ABSTRACT

A transmitter for a multiple frequency radio communication system provides a capability for filtering spread spectrum signals of a multiple frequency system by using one lowpass filter, and variably controlling the sampling speed when converting the lowpass filtered digital signal into an analog signal. In one embodiment, the transmitter comprises a clock generating section for receiving a predetermined bandwidth selecting control signal and then generating a clock having a speed in proportion to the predetermined bandwidth, a multiplexing section for inserting zero into a signal, spread modulated in a desired bandwidth, the bandwidth being selected from the plurality of frequency bandwidths according to the predetermined bandwidth selecting control signal, to produce an oversampled signal, a lowpass filter for receiving the clock and for lowpass filtering an output signal of the multiplexing section, a digital/analog converter for receiving the clock and then converting an output signal of the lowpass filter into an analog signal at the clock speed, and a switch for receiving the bandwidth selecting control signal and then switching an output of the digital/analog converter to a corresponding one of a plurality of intermediate frequency circuits according to the selected bandwidth.

7 Claims, 2 Drawing Sheets

TRANSMITTER OF MULTIPLE FREQUENCY RADIO COMMUNICATION SYSTEM

BACKGROUND OF THE INVENTION

1. Field of the Invention

The present invention relates generally to a radio communication system, and more particularly to a radio communication transmitter providing multiple frequency bandwidths.

2. Description of the Related Art

Current digital radio communication systems are primarily designed to provide voice service, which can be allocated to one frequency bandwidth since voice service user information is unified and its information rate is fixed. In the next-generation digital radio communication system, however, the user information may vary, comprising data, video and multimedia services, in addition to voice service. Accordingly, in order to efficiently use the limited frequency bands available and expand user capacity, a new multiple frequency bandwidth system capable of efficiently using frequency resources is required, in which one system (e.g. a mobile and fixed radio unit) provides a plurality of frequency bandwidths, so that a narrower bandwidth can be allocated to a service using a lower information rate, and a wider bandwidth can be allocated to a service using a higher information rate.

In general, a digital radio communication system must provide multiple frequency bandwidth characteristics to provide data service having varying information and information rates, in addition to voice service. In particular, to provide adequate capacity and variable services in a radio communication system such as a direct sequence code division multiple access (DS-CDMA), it is necessary to provide a multiple frequency bandwidth system.

The construction of a transmitter capable of providing multiple bandwidths based on the unitary baseband digital radio communication system in accordance with the prior art is illustrated in FIG. 1. A source coding section 111 compresses sound, data or video information inputted by a user service. Channel coding sections 112 and 113 code the outputs of the source coding section 111 to minimize a bit transferring error during radio communication. Channel coding sections 112 and 113 each use a different channel coding mode, respectively; one channel coding section 112 is a convolutional coder, and the other channel coding section 113 is a turbo coder, the turbo coder being concatenated with a Read-Solomon coder and a convolutional coder. By using two channel coding sections 112, 113, a channel coding mode can be selected based on the user service and the required level of service quality. Accordingly, any one of the channel coding sections 112, 113 may be used in accordance with the user service and the required level of service quality. For example, in the case of voice service, channel coding section 112 consisting of only one convolutional coder is used, while in the case where a higher quality data service is required, channel coding section 113 being concatenated with the Read-Solomon coder and the convolutional coder is used.

A multiplexer 114 selects the outputs of the channel coding section 112 or the channel coding section 113 by using a control signal of a controller (not shown). A digital modulating section 115 digital modulates the outputs of the multiplexer 114 in accordance with the characteristics of a digital radio communication system. For example, in the case of the DS-CDMA, the digital modulating section 115 carries out a spectrum spread and a data modulation (such as binary or quadrature phase shift keying; BPSK/QPSK).

The output of the multiplexer is spread at any one of the specific bandwidths among the multiple bandwidths, depending on the type of user service, in the digital modulating section 115, and the information related with the spread spectrum is passed through a respective lowpass filter 116, 117, 118 by a switching section (not shown) in order to improve the efficiency of the bandwidth and reduce the inter symbol interference. In particular, in order to filter the different spread spectrum signals, the multiple bandwidth system utilizes a number of lowpass filters 116, 117, 118, with varying frequency bandwidths and operating speeds. Each lowpass filter consists of a digital finite impulse response filter to maximize the efficiency of the frequency bandwidth only, or a pulse shaping digital finite impulse response filter to maximize the efficiency of the frequency bandwidth and reduce the inter symbol interference. A root raised cosine type is most commonly used as the pulse shaping digital finite impulse response filter.

A digital/analog converter 119 converts each of the digital signals filtered from the lowpass filters 116, 117, 118 into analog signals. The digital/analog converter 119 must have a sampling speed capable of converting a signal spread at a maximum bandwidth among multiple bandwidths of the system into an analog signal. A radio circuit section 120 filters the outputs of the digital/analog converter 119 between an intermediate frequency bandwidth and a radio frequency bandwidth and amplifies and transmits the resultant outputs through an antenna.

The prior art, system as described above has several disadvantages. First, because a number of digital lowpass filters (or pulse shaping filters) are used to provide multiple frequency bandwidths, additional power is required by the system (a mobile or fixed radio system) and reducing the size of the system becomes more difficult; second, unnecessary additional power is required for fast sampling when sampling the signal spread at other than the maximum bandwidth; and third, the number of digital/analog converters required makes reducing the size of the system more difficult.

SUMMARY OF THE INVENTION

Accordingly, the present invention overcomes the disadvantages of the prior art by accomplishing the following two objectives. One object is to provide a transmitter capable of reducing power consumption and thereby reduce the size of a radio communication system providing multiple frequency bandwidths.

Another object of the present invention is to provide a transmitter capable of filtering spread spectrum signals of a multiple frequency system by using one lowpass filter, and variably controlling the sampling speed when converting the lowpass filtered digital signal into an analog signal.

In order to achieve the above objects, according to the present invention, a transmitter of a multiple frequency radio communication system providing a plurality of frequency bandwidths comprises: a clock generating section for receiving a predetermined bandwidth selecting control signal and then generating a clock having a speed in proportion to the predetermined bandwidth; a multiplexing section for inserting zero into a signal, spread modulated in a bandwidth selected according to the predetermined bandwidth selecting control signal, to produce an oversampled signal; a lowpass filter for receiving the clock and for lowpass filtering an output signal of the multiplexing section; a digital/analog converter for receiving the clock and then converting an output signal of the lowpass filter into an analog signal at the speed of the clock; and a switch for receiving the bandwidth selecting control signal and then switching an output of the digital/analog converter to a corresponding one of a plurality of intermediate frequency circuits according to the selected bandwidth.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Figure 1:
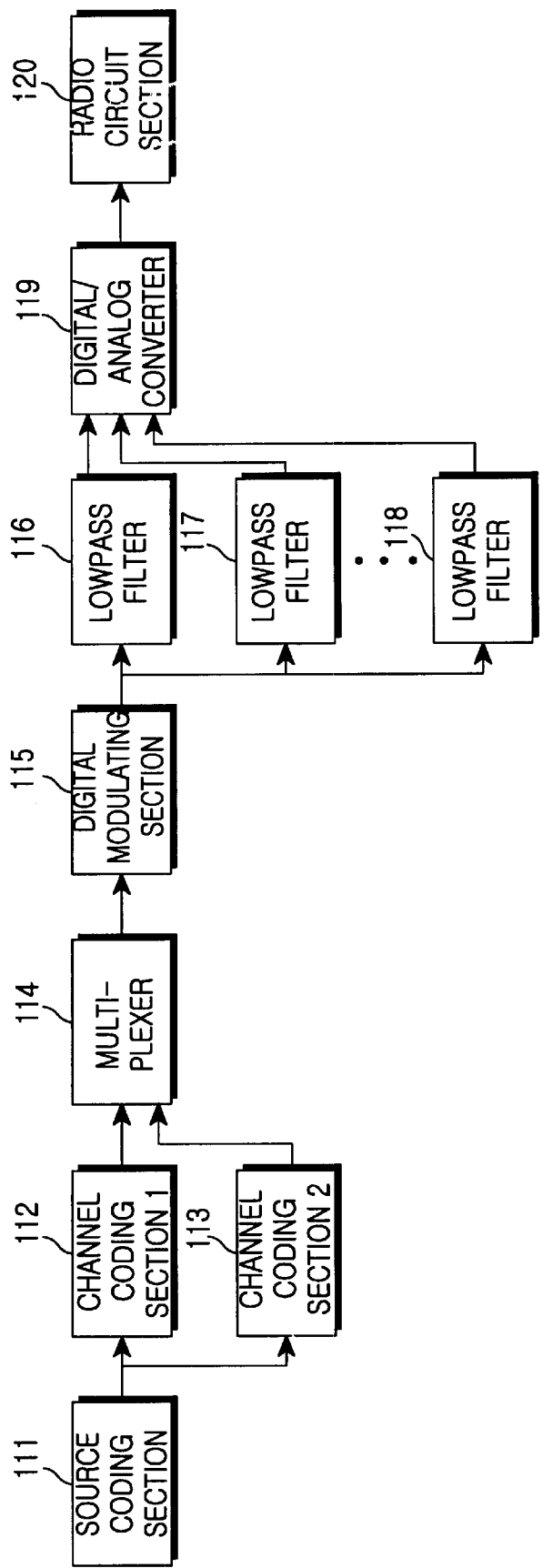
FIG. 1 is a block diagram illustrating a transmitter of a multiple frequency bandwidth radio communication system in accordance with the prior art.

The preferred embodiments of the present invention will now be described in greater detail with reference to the accompanying drawings, in which the same or similar elements are denoted by the same reference numerals in different drawings. A detailed description of known functions and configurations will be omitted as not to make the subject matter of the present invention unclear.

Figure 2:
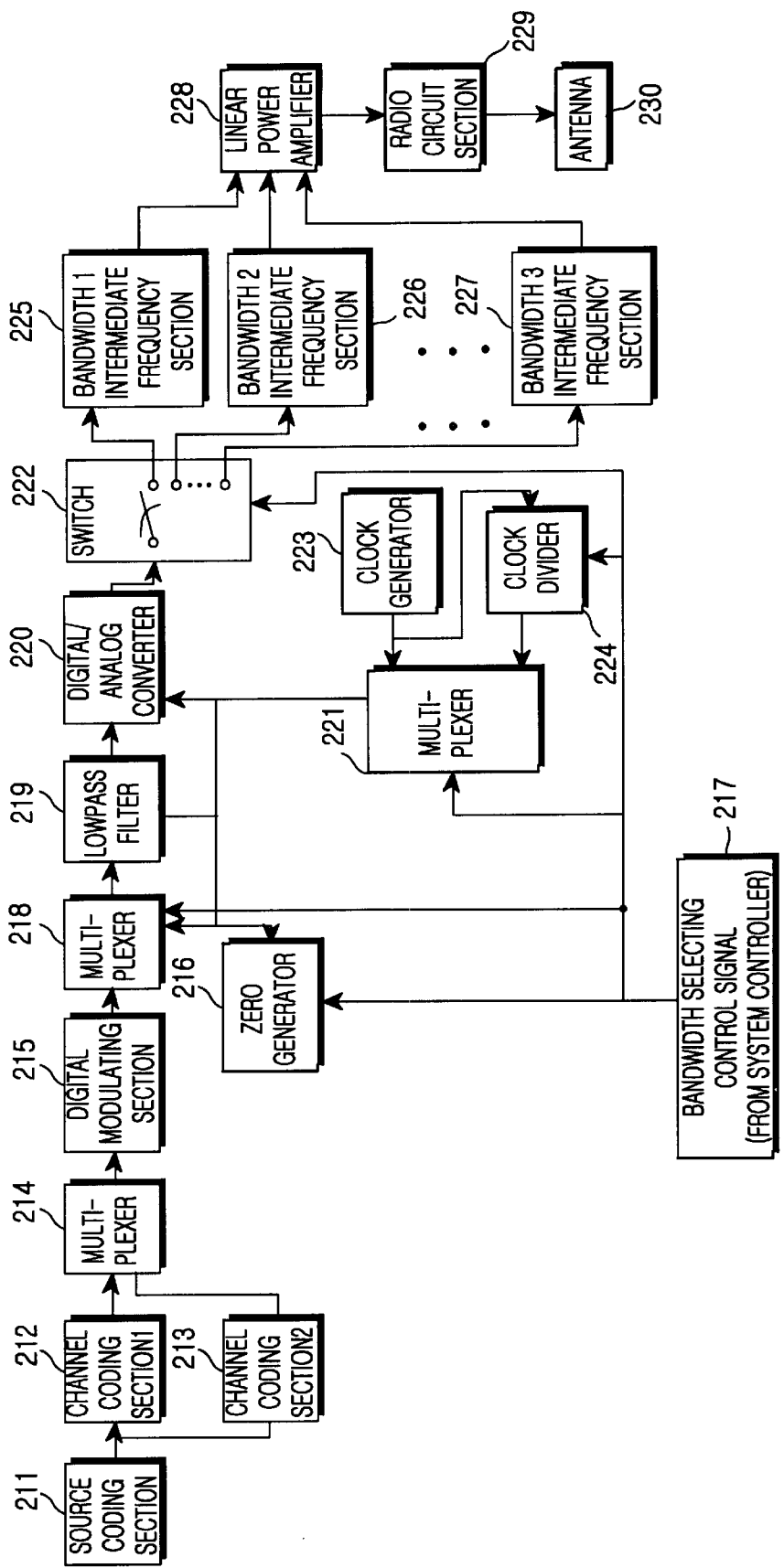
FIG. 2 is a block diagram illustrating a transmitter of a multiple frequency bandwidth radio communication system in accordance with the present invention.

Referring now to FIG. 2, a source coding section 211 compresses sound, data or video information inputted by auser service. Channel coding sections 212 and 213 code the outputs of the source coding section 211 to minimize a bit transferring error during radio communication. The channel coding sections 212, 213 each use a different channel coding mode; one channel coding section 212 is a convolutional coder, and the other channel coding section 213 is a turbo coder, the turbo coder being concatenated with a Read-Solomon coder and a the convolutional coder. By using two channel coding sections 212,213, channel coding mode can be selected depending on the user service and the required level of service quality. For example, in the case of voice service, the channel coding section 212 consisting of only convolutional coder is used, while in the case where a higher quality data service is required, the channel coding section 213 which is concatenated with the Read-Solomon coder and the convolutional coder is used.

A multiplexer 214 selects the outputs of the channel coding section 212 or the channel coding section 213 by using a control signal of a controller (not shown). A digital modulating section 215 digitally modulates the outputs of the multiplexer 214 in accordance with the characteristics of the digital radio communication system. For example, in the case of a DS-CDMA communication system, the digital modulating section 215 carries out a spectrum spread and a data modulation (such as QPSK, BPSK, or the like).

A bandwidth selecting control signal 217 is a control signal for selecting a specific frequency bandwidth, on which, in a controller (not shown) providing multiple frequency bandwidths, the user information is transmitted. A zero generator 216 is applied with a desired clock and produces zero for oversampling operation of the lowpass filter at the selected frequency bandwidth.

A second multiplexer 218 is applied with the outputs of the digital modulating section 215 and the zero generator 216, and is applied with the same clock as the clock inputted into the zero generator 216, thereby inserting the zero into the outputs of the digital modulating section 215. The same clock as the clock inputted into the zero generator 216 and the second multiplexer 218 is applied to a lowpass filter 219, and the filter 219 filters a low bandwidth from the output of the multiplexer 218.

The clock is also applied to a digital/analog converter 220, and the converter 220 converts the digital signal, of which the low bandwidth is filtered, into an analog signal. At that time, the digital/analog converter 220 must have a sampling speed capable of converting a signal spread to a selected bandwidth into an analog signal. In accordance with the bandwidth selecting control signal 217, the output of the digital/analog converter 220 is transferred to the intermediate frequency section 225, 226, 227 by a switch 222. The intermediate frequency section 225,226, 227 filter an intermediate frequency low bandwidth among the inputted signals.

A linear power amplifier 228 linearly amplifies the outputs of the intermediate frequency lowpass filters. A radio circuit section 229 mixes the outputs of the linear power amplifier 228 with a suboscillating frequency to produce a radio frequency, filters and transmits the radio frequency through an antenna 230. A clock generator 223 produces a clock at the widest bandwidth spreading speed of multiple bandwidths provided by the system. The output signal of the clock generator 223 is inputted to a clock divider 224 for producing a clock to support another bandwidth which is related with integer times.

A third multiplexer 221 selects any one of the clocks outputted from the clock generator 223 and the clock divider 224 in accordance with the bandwidth selecting control signal 217, and supplies the zero generator 216, the second multiplexer 218, the lowpass filter 219, and the digital/analog converter 220 with the selected clock.

The operation of the transmitter according to the present invention is described hereinafter, however, descriptions for a source coding section 211, a channel coding section 212, a channel coding section 213, a multiplexer 214, a digital modulating section 215, a radio circuit section 229, and an antenna 230, are omitted since they have already described in the Description of Related Art. The below description is adapted to a multiple bandwidth system supporting n frequency bandwidths B1, B2, . . . , BN in one system, however, the invention is not limited to systems of this type.

In a digital radio communication system, the bandwidths B1, B2, . . . , BN are allocated as integer multiples of the most narrow bandwidth B1. For example, when B1 is 5M, B2 corresponds to 10M. Band spreading rates $R_{S1}$, $R_{S2}$, . . . , $R_{SN}$ correspond to the above bandwidths B1, B2, . . . BN, respectively. The band spreading rates are also integer multiples of the lowest spreading rate, $R_{S1}$. For example, $R_{S2}$ corresponds to $2R_{S1}$. In the case of the multiple bandwidth DS-CDMA systems, the digital modulating section 215 carries out the data modulation (such as QPSK, BPSK, or the like) and the spreading modulation. The spreading modulation is spread in a specific bandwidth from among the multiple spread bandwidths in line with the user service or the information rate. The second multiplexer 218 and the zero generator 216 oversamples a signal to be inputted to the digital lowpass filter or the pulse shaping lowpass filter 219. The oversample of the signal inputted to the lowpass filter can enhance the accuracy of the analog signal converted by the digital/analog converter 220.

The digital lowpass filter 219 (or the pulse shaping lowpass filter) designs tap coefficients and tap orders, which determine an impulse response at time range of the filter in accordance with the required specification (passing bandwidth frequency, base frequency, and power attenuation of the passing and baseband) of the filter, to realize the digital finite filter. Where the system provides multiple frequency bandwidths B1, B2, . . . , BN, the specification of the lowpass filter 219 is identical to each of the above multiple bandwidths. Accordingly, considering the specification and the complexity of the filter independent of the multiple bandwidths, the tap coefficient and the tap order of the filter should be designed identically. Although the tap coefficient and the tap order of the filter are fixed independent of the bandwidth, the operating speed of the filter should be different than the bandwidth, because the bandwidth is determined depending on the operating speed of the lowpass filter 219, i.e., the speed of the clock applied to the lowpass filter 219.

The tap coefficient and the tap order of the filter 219 which is designed using integer time functions of the bandwidths B1, B2, . . . , BN and bandwidth spreading rates $R_{S1}$, $R_{S2}$, . . . , $R_{SN}$ are each fixed. The operation of the filter 219 coinciding with the multiple bandwidth spreading rate is described hereinbelow.

The zero generator 216 determines the number of zero insertions according to the oversample rate to perform the oversampling operation of the signal inputted to the lowpass filter 219. After determining the number of zeros to be inserted, the zero generator 216 generates those zeros in a successive fashion. The multiplexer 218 receives the bandwidth selecting control signal along with clocks, so that it inserts the zeros output from the zero generator 216 into the signal output from the digital modulator 215 in a successive fashion, and outputs the resultant signal. In general cases, the oversample rate uses four times the bandwidth spreading rate $R_{S1}$, $R_{S2}$, . . . , $R_{SN}$. For example, in the case of oversampling four times, the zero generator 216 sequentially inserts three zeros (0 0 0) between the output bits of the digital modulator 215 through the multiplexer 218 to output the four timed oversample to the lowpass filter 219. The number of zero insertion, i.e., the oversample rate is controlled by the bandwidth selecting control signal provided from a system controller (not shown), and the bandwidth selecting control signal is also used as a control signal for the clock divider 224 and the switch 222.

The clock generator 223 generates a clock at an oversampling speed of the widest bandwidth spreading rate $R_{S1}$, $R_{S2}$, . . . , $R_{SN}$ of the multiple bandwidths provided by the multiple bandwidth DS-CDMA system. The clock divider 224 is another clock signal for supporting another bandwidth being an integer multiple of the output signal of the clock generator 223. The divided clock speed of the clock divider 224 and the required number of dividers equal the number of multiple bandwidths provided by the multiple bandwidth DS-CDMA system. For example, in the case of a DS-CDMA system providing three frequency bandwidths B1, B2 and B3 (the maximum bandwidth being B3), the required number of clock dividers 224 is two, and the speed of the outputted clock is determined according to the integer relationship between the bandwidths B1, B2 and B3 (e.g. B3 is eight times B1, B2 is four times B1). Accordingly, the output clock of the clock generator 223, which is used in the widest bandwidth B3, is divided by ⅛ for bandwidth B1, or ¼ for bandwidth B2. The multiplexer 221 receives the bandwidth selecting control signal 217, and thereby selects one clock signal among the output clocks of the clock generator 223 and the clock divider 224, and outputs it to the multiplexer 218, the lowpass filter 219, the digital/analog converter 220, and the zero generator 216.

The user information in the bandwidth selected by the bandwidth selecting control signal of the multiple bandwidths is oversampled and inputted into the digital/analog converter 220 through the lowpass filter 219. In order to operate the digital/analog converter 220, the clock, which is received from the clock generator 223 when the bandwidth is the widest, or is received from the clock generator 224 when the bandwidth is not the widest, is inputted into the converter 220. Therefore, the operating speed of the digital/analog converter 220 is not fixed at the maximum clock speed, but is shifted in response to the selected bandwidth. In other words, if the clock speed regarding the selected bandwidth is slow, the clock speed which is applied to the digital/analog converter 220 is slow. Accordingly, it is possible for the digital/analog converter 220 to reduce the power consumed, when compared with the digital/analog conversion at the clock speed corresponding to the maximum bandwidth independent of the bandwidth. The signal outputted from the digital/analog converter 220 is inputted into the switch 222 for switching to an intermediate frequency and a radio frequency circuit in response to the selected bandwidth, because a filter and a circuit of the intermediate frequency and radio frequency bandwidth may be constructed differently from each other depending on the selected bandwidth. The switch 222 is received with the bandwidth selecting control signal, and switches the outputs of the digital/analog converter 220 into the bandwidth intermediate circuit among the bandwidth intermediate frequency section 225, 226, 227. The signal filtered through the intermediate frequency filter is amplified through the linear power amplifier 228, filtered at a radio frequency through the radio circuit section 229, and transmitted through the antenna 230.

Therefore, the present invention can reduce the power consumed in the baseband lowpass filter and the digital/analog converter. Also, the present invention can provide multiple bandwidths via the lowpass filter and the digital/analog converter. The system's size can also be decreased as a result.

While this invention has been described in connection with what is presently considered to be the most practical and preferred embodiment, it is to be understood that the invention is not limited to the disclosed embodiment, but, on the contrary, it is intended to cover various modifications within the spirit and scope of the invention as described in the appended claims.

What is claimed is:

1. A transmitter for use in a multiple frequency radio communication system providing a plurality of frequency bandwidths, the transmitter comprising:

a clock generating section for receiving a predetermined bandwidth selecting control signal and then generating a clock having a speed in proportion to the predetermined bandwidth;

a multiplexing section for inserting zero into a signal, spread modulated in a bandwidth selected according to the predetermined bandwidth selecting control signal, to produce an oversampled signal;

a lowpass filter for receiving the clock and for lowpass filtering an output signal of the multiplexing section;

a digital/analog converter for receiving the clock and then converting an output signal of the lowpass filter into an analog signal at said clock speed; and a switch for receiving the bandwidth selecting control signal and then switching an output of the digital/analog converter to a corresponding one of a plurality of intermediate frequency circuits according to the selected bandwidth.

2. The transmitter as recited in claim 1, wherein the clock generating section comprises:
- a clock generator for generating a fast clock for a widest frequency bandwidth among the plurality of frequency bandwidths;
- a clock divider for dividing the fast clock to produce a clock corresponding to each one of the plurality of frequency bandwidths; and
- a second multiplexer for receiving the bandwidth selecting control signal, thereby selecting a desired one from the clock outputted from the clock generator and the clock outputted from the clock divider.

3. The transmitter as recited in claim 1, wherein the multiplexer section comprises:
- a zero generator for generating a desired number of zeros in accordance with the bandwidth selecting control signal; and
- a first multiplexer for receiving the clock outputted from the second multiplexer along with the bandwidth selecting control signal and then inserting the generated zeros into the spread modulated signal.

4. The transmitter as recited in claim 3, wherein the zero generator generates an increased number of zeros for a wider bandwidth.

5. The transmitter as recited in claim 4, wherein the first multiplexer successively inserts the generated zeros into respective 1-bit data portions of the spread modulated signal.

6. The transmitter as recited in claim 1, wherein the lowpass filter is a pulse shaping filter.

7. The transmitter as recited in claim 1, wherein the lowpass filter is a digital infinite impulse response filter.

* * * * *